Patented Aug. 31, 1926.

1,598,370

UNITED STATES PATENT OFFICE.

PAUL EMILE GOISSEDET AND ANDRÉ LOUIS HUSSON, OF LYONS, FRANCE, ASSIGNORS TO SOCIETE CHIMIQUE DES USINES DU RHONE, OF PARIS, FRANCE.

MANUFACTURE OF PHOSPHORIC ESTERS OF POLYHYDRIC ALCOHOLS.

No Drawing. Application filed September 15, 1925, Serial No. 56,443, and in France April 27, 1925.

Various processes have been proposed for the preparation of phosphoric esters of the carbohydrates and of polyvalent alcohols, particularly Neuberg and Pollak, (Thesis, read at the Berlin University in 1910—Werke Byk, proprietors of German Patent No. 247,809 of the 3rd February 1910) prepare the glucose and saccharose monophosphoric esters by the action, at low temperature, of phosphorous oxychloride on sugar in aqueous solution, in presence of calcium carbonate or of lime. In this manner the calcium salt of the phosphoric combination is formed and this, being insoluble in alcohol, is separated from the concentrated reacting solution by precipitation with alcohol. In this manner of proceeding, this calcium salt is obtained in presence of large quantities of calcium chloride which contaminate the precipitate from which it can be entirely eliminated only by repeated precipitation and washings with alcohol.

With levulose, lactose and maltose the elimination of the calcium chloride becomes practically impossible owing to the formation of stable combinations of the phosphoric product with the calcium chloride, as has been recognized by Neuberg and Ketschimer (Bioch. Zeitschrift, 1911 vol. 36, page 5).

The present invention has for its object a new process of fabrication of the phosphoric esters of carbohydrates and polyvalent alcohols, which gives good yields and which permits the isolation of these products directly in the state of calcium salts without having recourse to a delicate and costly purification. It consists in treating the carbohydrates and the polyvalent alcohols with phosphoric anhydride in presence of anhydrous tertiary bases, such as pyridine and its homologues.

Applicants have found that when performing the combination in these conditions, one obtains the sought product with great regularity; this result is very remarkable, for if the phosphoric anhydride is caused to react on these bodies, either directly or in the presence of usual solvents such as benzene or toluene only poor results were obtained owing to the too energetic condensing and dehydrating action of this anhydride.

Carbohydrate or polyvalent alcohol may be dissolved in the reacting medium or suspended therein. One may utilize either a pure tertiary base, or a mixture of several such bases, which may be diluted with a solvent which does not react chemically on the other bodies present.

A few examples, illustrating the manner in which the process is carried out, are given hereunder, it being well understood that these examples are in no way limitative.

*Example I.*—Glucose: 10 kilos of dry glucose are dissolved in 50 kilos of pyridine and are introduced in an apparatus provided with a stirrer, 7.800 kilos of phosphoric anhydride in suspension in 2 kilos of pyridine are added. The mixture is heated for a few hours at 60–65° C. and the excess of pyridine is subsequently distilled. After cooling, 50 litres of water are added, and the aqueous solution is saturated with carbonate of lime. It is filtered and concentrated in vacuo at a low temperature. The glucose monophosphate of calcium is then precipitated directly with alcohol.

*Example II.*—Levulose: by replacing in the preceding example glucose by levulose, levulose monophosphate of calcium is obtained in similar conditions.

*Example III.*—Saccharose: 10 kilos pulverized saccharose, dried in an oven for several hours at 80° C. are suspended in 30 kilos of anhydrous pyridine, 4,500 phosphoric anhydride in suspension in 1 kilos of pyridine are added. The mixture is heated to 90–100° C. during several hours with stirring and the excess of pyridine is afterwards distilled.

The residue is treated with water and saturated with milk of lime, filtered and concentrated in vacuo. The saccharose monophosphate of calcium is then precipitated with alcohol.

*Example IV.*—By replacing in Example III saccharose by lactose, lactose monophosphate of calcium is obtained in similar conditions.

*Example V.*—Mannite. (a) monophosphoric ester; 2 kilos of mannite dried in an oven are suspended in 8 kilos of pyridine. The mixture is introduced in a stirred vessel and 1.600 kilos of phosphoric anhydride is added. The temperature is raised to about 110–115° C. with stirring. At the end of the operation the pyridine and the residue is dissolved in water. The solution is neutralized with milk of lime which frees the pyridine from its phosphoric combinations and forms the mannite-monophosphate of calcium isolated in the form of a white powder very soluble in water.

(b) Diphosphoric-ester: By using in the preceding example a double quantity of phosphoric anhydride, a phosphoric ester is isolated which corresponds to mannite diphosphoric ester.

The preceding examples show that the process is general and permits the calcium salt of the phosphoric esters of the carbohydrates and of the polyvalent alcohols to be very easily isolated and with good yields.

Particularly, it allows the manufacture, by direct esterification, of the monophosphoric esters of levulose and lactose, which it had not been possible to obtain directly hitherto.

What we claim and desire to secure by Letters Patent is:—

1. A process of manufacture of phosphoric esters of polyvalent alcohols consisting in treating these polyvalent alcohols by phosphoric anhydride in presence of tertiary bases and separating the esters obtained from the reacting medium by precipitating their calcium salt.

2. A process of manufacture of phosphoric esters of polyvalent alcohols consisting in treating these polyvalent alcohols by phosphoric anhydride in presence of a compound of the pyridine series, and separating the ester so obtained from the reacting medium by precipitating their calcium salt.

3. A process of manufacture of phosphoric esters of polyvalent alcohols consisting in treating these polyvalent alcohols by phosphoric anhydride in presence of pyridine, and separating the esters obtained from the reacting medium by precipitating their calcium salt.

4. A process for the manufacture of a phosphoric ester of glucose, consisting in treating glucose with phosphoric anhydride in presence of a tertiary base, and separating the ester by means of carbonate of calcium.

5. A process for the manufacture of a phosphoric ester of glucose, consisting in treating glucose with phosphoric anhydride in presence of a compound of the pyridine series, and separating the ester by means of carbonate of calcium.

6. A process for the manufacture of a phopsphoric ester of glucose, consisting in treating glucose with phosphoric anhydride in presence of pyridine and separating the ester by means of carbonate of calcium.

7. A process for the manufacture of glucose monophosphate of calcium consisting in treating glucose with phosphoric anhydride in presence of pyridine and separating the ester by means of carbonate of calcium.

In testimony whereof we have signed our names to this specification.

PAUL EMILE GOISSEDET.
ANDRÉ LOUIS HUSSON.